United States Patent [19]
Miyake et al.

[11] Patent Number: 5,903,618
[45] Date of Patent: May 11, 1999

[54] MULTIMODE RADIO COMMUNICATION SYSTEM

[75] Inventors: Masayasu Miyake, Fuchu, Japan; Lucian X. Dang, San Francisco, Calif.

[73] Assignee: Casio Computer Co., Ltd., Tokyo, Japan

[21] Appl. No.: 08/503,576

[22] Filed: Jul. 18, 1995

[51] Int. Cl.$^6$ ........................................................ H04L 7/00
[52] U.S. Cl. .......................... 375/356; 370/337; 370/338; 370/347; 455/11.1; 455/452; 455/517
[58] Field of Search .............................. 375/356; 370/321, 370/328, 337, 338, 345, 347, 401; 455/11.1, 509, 517, 450, 422, 552, 553

[56] References Cited

U.S. PATENT DOCUMENTS 5,128,665  7/1992  DeLuca et al. .
5,335,246  8/1994  Yokev et al. .
5,379,047  1/1995  Yokev et al. .

*Primary Examiner*—Don N. Vo
*Attorney, Agent, or Firm*—Alan H. MacPherson; Gary J. Edwards; Skjerven, Morrill, MacPherson, Franklin & Friel

[57] ABSTRACT

Like a conventional one-way pager system, a two-way pager system is provided in which a message is received by paging from a base station and a message responding to the received message is returned to the base station. In this system, direct communication and peer-to-peer communication between terminals are performed. All the terminals included in the service area of the base station are always synchronized with sync signals paged from the base station. No special infrastructure is therefore required for synchronizing the terminals with the sync signals to perform the peer-to-peer communication. Furthermore, since each of the terminals receives a paging signal during the peer-to-peer communication, it can respond to a paging call.

12 Claims, 18 Drawing Sheets

MULTIMODE RADIO COMMUNICATION SYSTEM

BACKGROUND OF THE INVENTION

1. Field of the Invention

The present invention relates to a multimode radio communication system and, more specifically, to a multimode radio communication system capable of both indirect terminal-to-terminal communication performed through a base station and direct terminal-to-terminal communication performed not through a base station, for example, peer-to-peer communication.

2. Description of the Related Art

An example of a radio communication system is a pager system wherein a base station having a transmitting antenna of 100 meters or more in height is provided within every service area whose radius is about 30 kilometers. To call a specified terminal (pager) holder in this system, a caller dials the calling number of a pager of the terminal holder by telephone. In response to the calling number, a service center of a pager service company makes all the base stations send forth the calling number at once (or page the calling number). Upon receiving the calling number, the pager gives a calling sound to inform the terminal holder of the call. Recently a pager system capable of transmitting a message as well as a calling number, has been developed, in which not only is a calling sound produced but a message is displayed on a display of a terminal.

In either case, however, since the prior art pager system is directed to one-way communication from a base station to a terminal, another communication system, such as telephone, has to be employed when a called party wishes to respond to a received calling number or a received message. To eliminate this problem, a two-way pager system (or bidirectional pager system) capable of transmitting a response message from a terminal (pager) to a base station, has recently been developed.

According to one proposal of the two-way pager system, the same communication system as that of the normal one-way pager system is used in the down link from the base station to the pager, while a communication system different from that of the one-way pager system is adopted in the up link from the pager to the base station, as described in U.S. Pat. No. 5,335,246. The two-way radio communication between two pagers is achieved as follows: A transmission message is transmitted from one of the pagers to a service center of a pager service company using an up link through a base station. The service center makes all base stations transmit the transmission message at once (or page) through the down links. Upon receiving the transmission message, the other pager transmits a response message to the base station through the up link and then to the service center, as described above. The service center returns the response message to the former pager via the base station using the down link.

Moreover, there are a portable telephone system and a mobile telephone system as other radio communication systems for achieving two-way communication.

The foregoing communication systems are all based on the premise of the use of service provider infrastructure equipment such as base stations and telephone lines. Therefore, even when two terminals for two-way communication are close to each other and no infrastructure equipment is required, a signal always has to be transmitted via both a base station and a service center, with the result that the time for communication between the two terminals is lengthened and the infrastructure equipment runs to waste.

SUMMARY OF THE INVENTION

Accordingly, it is an object of the present invention to provide a multimode radio communication system capable of terminal-to-terminal communication, i.e., peer-to-peer communication, performed without using any infrastructure equipment, as well as two-way radio communication performed using infrastructure equipment.

A related object of the present invention is to provide a multimode radio communication terminal capable of terminal-to-terminal communication, i.e., peer-to-peer communication, performed without using any infrastructure equipment, as well as two-way radio communication performed using infrastructure equipment.

A further object of the present invention is to provide a base station used for a multimode radio communication system capable of terminal-to-terminal communication, i.e., peer-to-peer communication, performed without using any infrastructure equipment, as well as two-way radio communication performed using infrastructure equipment.

A still further object of the present invention is to provide a multimode radio communication method capable of terminal-to-terminal communication, i.e., peer-to-peer communication, performed without using any infrastructure equipment, as well as two-way radio communication performed using infrastructure equipment.

According to the present invention, there is provided a multimode radio communication system comprising a base station connected to a wire communication network, the base station transmitting a sync signal; and a plurality of radio communication terminals wirelessly connected to said base station, said plurality of radio communication terminals being operated in synchronization with the sync signal transmitted from said base station, and a first radio communication terminal of said plurality of radio communication terminals indirectly communicating with a second radio communication terminal thereof through said base station or directly communicating with the second radio communication terminal in synchronization with the sync signal.

According to the present invention, there is provided a radio communication terminal comprising means for receiving a sync signal transmitted from a base station connected to a wire communication network; and means for directly communicating with another radio communication terminal by a peer-to-peer communication system in synchronization with the sync signal without using the base station.

According to the present invention, there is provided a base station communicating with radio communication terminals, comprising means for receiving signals from the radio communication terminals; means for detecting positions of the radio communication terminals based on the signals received by said receiving means; means for producing a link prediction parameter indicating whether or not there is a peer-to-peer communication between the radio communication terminals based on the positions of the radio communication terminals; and means for transmitting the link prediction parameter to the radio communication terminals.

According to the present invention, there is provided a radio communication method for a radio communication terminal, comprising steps of receiving a sync signal transmitted from a base station; and executing a peer-to-peer communication with another radio communication terminal in synchronism with the sync signal without using the base station.

Since the multimode radio communication system of the present invention allows communication without using infrastructure equipment as well as communication using infrastructure equipment, the infrastructure equipment can effectively be utilized, and new infrastructure equipment is not always required. The use of infrastructure equipment may impose restrictions such as communication speed and communication capacity on the system. These restrictions can be removed if communication is executed without using any infrastructure equipment.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Figure 1:
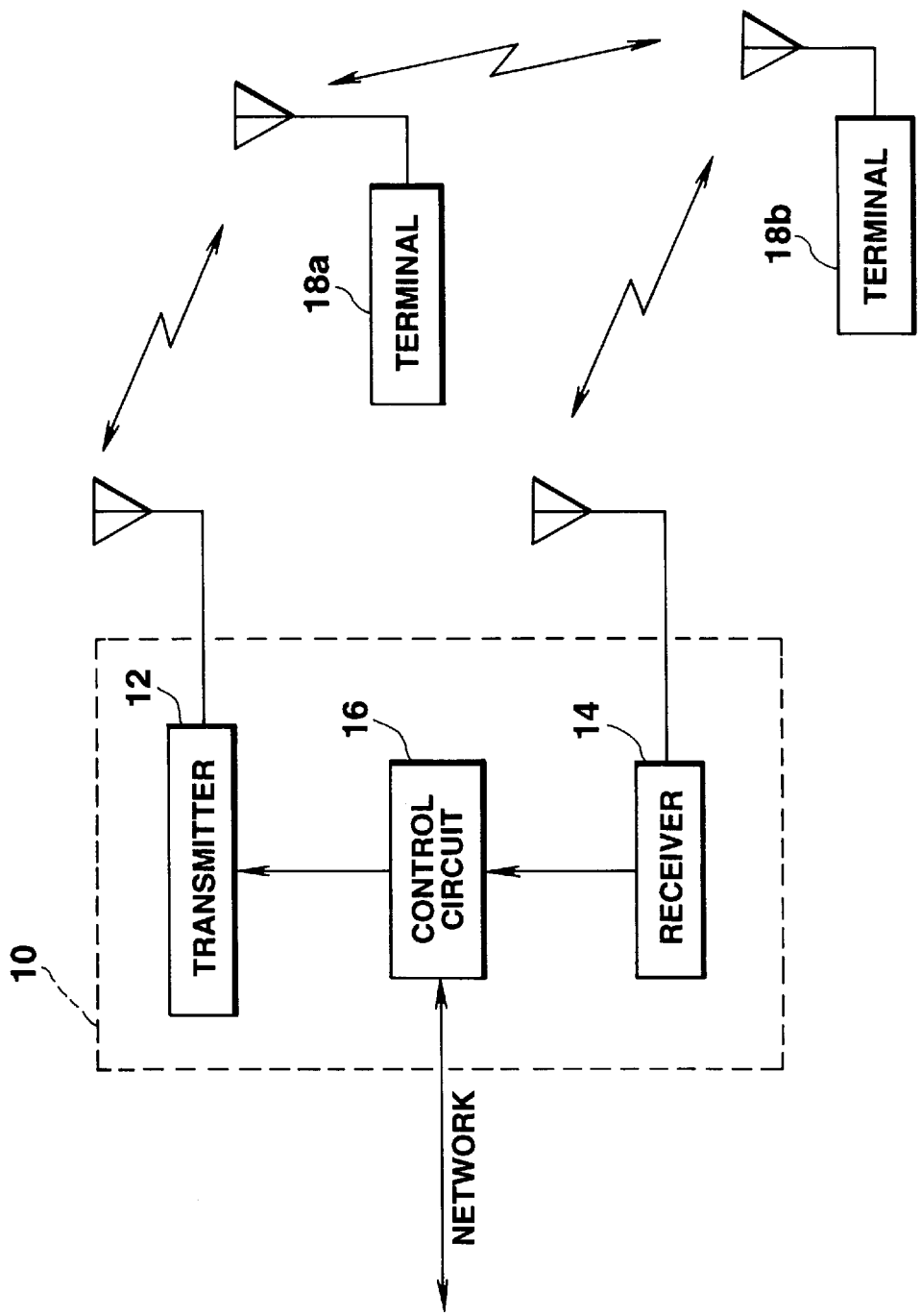
FIG. 1 is a block diagram of a multimode radio communication system according to a first embodiment of the present invention.

A preferred embodiment of a multimode radio communication system according to the present invention will now be described with reference to the accompanying drawings.
First Embodiment FIG. 1 is a block diagram showing the entire constitution of a multimode radio communication system according to a first embodiment of the present invention. A two-way pager system capable of peer-to-peer communication will now be described as the first embodiment.

A plurality of terminals (pagers), for example, two pagers 18a and 18b, are present within a service area of a base station 10 connected to a service center through a wire telephone network (not shown). A number of base stations are connected to the service center, though not shown. The base station 10 includes a transmitter 12, a receiver 14, and a control circuit 16. The transmitter 12 pages the pagers 18a and 18b. The same communication system as a commonly-used one-way pager system is adopted in the down links from the base station 10 to the pagers 18a and 18b. Such a down-link communication system comprises a POCSAG (Post Office Code Standardization Advisory Group) system (CCIR Rec. 584), a GSC (Golay sequential Code) system (CCIR Rec. 900), an NTT (Nippon Telegraph & Telephone Company) system, and the like. The POCSAG system is adopted in this embodiment, though any of these can be done.

The receiver 14 of the base station 10 receives transmission signals from the pagers 18a and 18b. A communication system different from the one-way pager system is adopted in the up links from the pagers 18a and 18b to the base station 10. The up-link communication system comprises the same digital communication system as a conventional two-way communication system and a spectrum spreading communication system using an ISM (Industrial Scientific Medical) band which was widely open to wireless LAN in the United States and Europe and is considered to be easily employed. This spectrum spreading communication system is more resistant to interference than a frequency-division multiplexing system on a time-division multiplexing system and thus is widely used. The spectrum spreading communication system is roughly divided into a direct spreading system and a spread spectrum frequency hopping (SSFH) system. While the direct spreading system is a system of spreading information in the form of frequency (spectrum) by a code having orthogonality, the SSFH system is a system of transmitting a signal by varying (hopping) its frequency as time passes. By selecting any one of preset frequencies at predetermined time, both the transmission and reception are performed. To do this, information of the predetermined time and the preset frequencies must be held in each of the transmitting and receiving terminals. Since any frequency can be selected at the predetermined time, the communications corresponding to the usable number of frequencies can be performed at once. If the predetermined time is divided, the number of simultaneously communicable terminals can be increased.

If the frequency of the SSFH system is fixed to the single frequency, the SSFH system is equivalent to the conventional two-way communication system. Therefore, the above description can be also applied to the conventional two-way communication system and the conventional two-way communication system can be used for the up-link communication system instead of the SSFH system.

In the following description, the SSFH system is employed. However, it is possible to use the direct spreading system for the up-link communication system.

Figure 2:
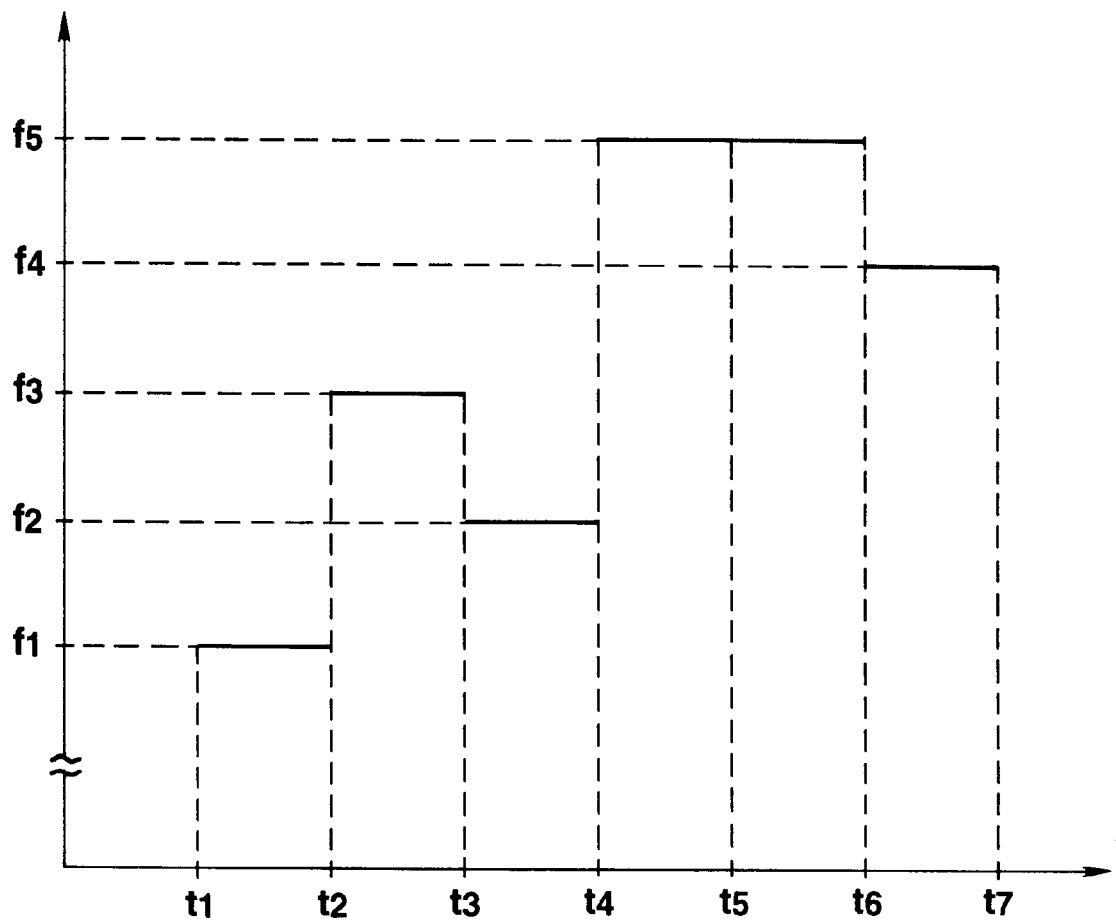
FIG. 2 is a schematic view of peer-to-peer communication and SSFH communication used in an up link of two-way pager communication according to the present invention.

FIG. 2 shows the principle of the SSFH system described above. Referring to FIG. 2, any one of the frequencies $f_1$ to $f_5$ is selected whenever a fixed period of time elapses. After time $t_7$, a pattern of frequency variations from $t_1$ to $t_7$ is repeated.

If the transmitting terminal and the receiving terminal have the same frequency hopping timing ($t_1$) and the same frequency hopping pattern, it is possible to demodulate the transmitting signal at the receiving terminal. In order to execute a SSFH communication system, it is necessary to make the frequency hopping pattern of the transmitting terminal equal to that of the receiving terminal. There are two methods for making the frequency hopping pattern of the transmitting terminal equal to that of the receiving terminal. According to one method, the same frequency hopping pattern is previously set to the transmitting terminal and the receiving terminal. Alternately, it is possible to set a plurality of frequency hopping patterns to the transmitting terminal and the receiving terminal. In the latter case, it is necessary to inform the receiving terminal of information as to which frequency hopping pattern is selected before the start of communication. In the following description, the former method is employed. However, it is possible to employ the latter method. If the latter method is employed, it is necessary to transmit a parameter signal from the transmitting terminal to the receiving terminal before the start of communication, the parameter indicating which frequency hopping pattern is selected.

Returning to FIG. 1, the control circuit 16 receives a signal from the service center through the telephone network and then supplies it to the transmitter 12. The circuit 16 also supplies an output signal from the receiver 14 to the transmitter 12 or the service center.

Figure 3:
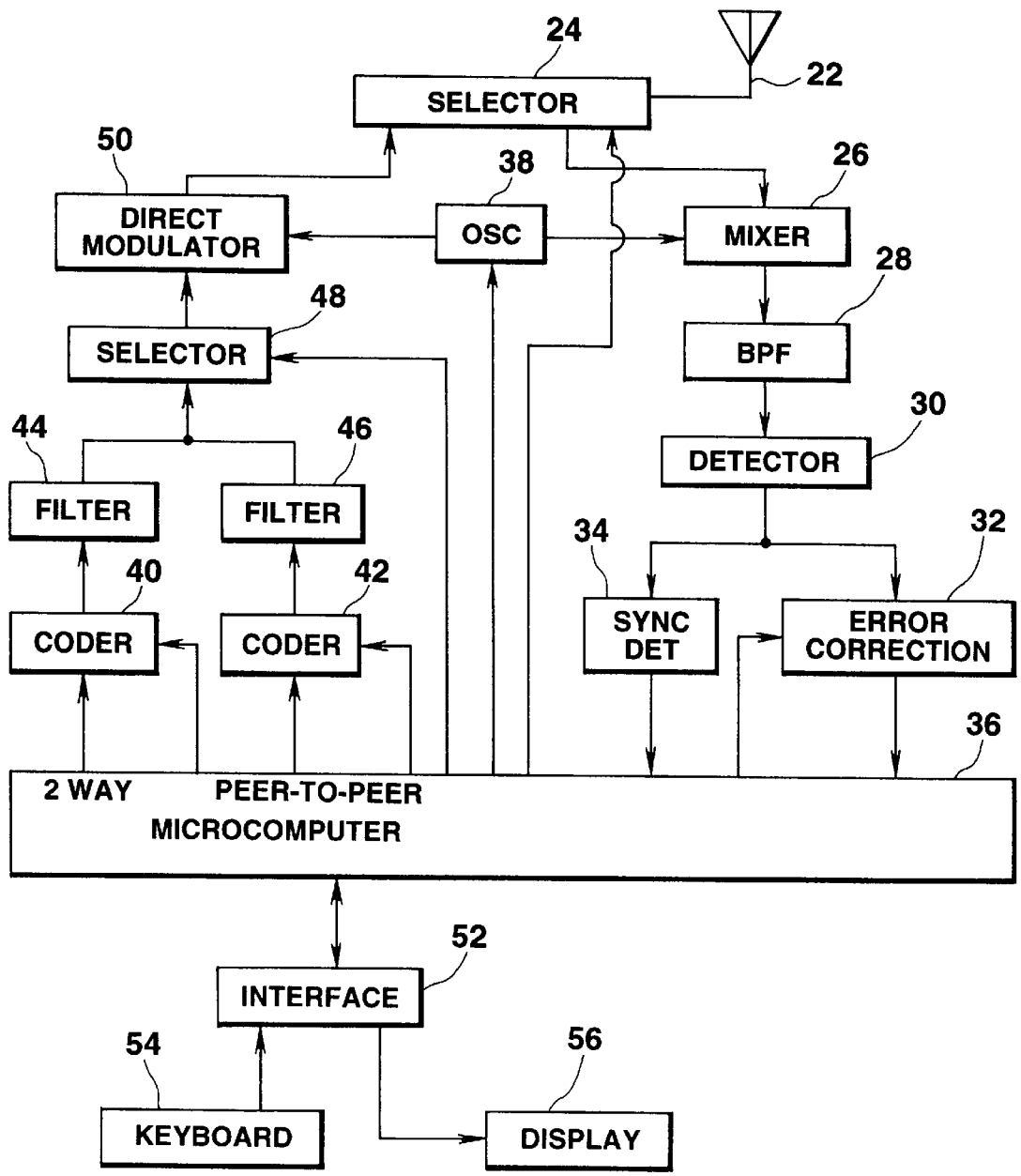
FIG. 3 is a block diagram showing a multimode radio communication terminal according to the first embodiment.

The constitution of the terminals 18a and 18b is illustrated in FIG. 3. The terminals of the first embodiment feature two-way communication between two terminals through the base stations and peer-to-peer communication directly between them, not through the base stations. It is assumed that the peer-to-peer communication is performed by the SSFH system as in the up link of the two-way pager communication. As described above, SSFH communication system is used for the peer-to-peer communication system as well as the two-way pager system (up link). However, it is not necessary to use the same frequency hopping rate or the same synchronization signal for the peer-to-peer communication system and the two-way pager system (up link). Further, it is not necessary to use the same modulation rate for the peer-to-peer communication system and the two-way pager system (up link).

Each terminal of the present invention includes an antenna 22 used for both transmission and reception, and a transmission/reception selector 24 is connected thereto. The selector 24 selects one of transmission and reception modes by means of a microcomputer 36. A signal received by the antenna 22 is sent to a mixer 26 via the selector 24. The mixer 26 is supplied with a predetermined oscillation signal from an oscillator 38. By controlling the microcomputer 36, the oscillator 38 outputs a signal having a predetermined frequency at the time of POCSAG communication (two-way pager communication in its down link), and outputs a signal, the frequency of which varies with the predetermined pattern as shown in FIG. 2 at the time of SSFH communication (two-way pager communication in its up link and peer-to-peer communication).

The mixer 26 converts a received high-frequency signal into an intermediate-frequency signal. The intermediate-frequency signal is supplied to a detector 30 via a BPF (band pass filter) 28 and subjected to amplification, detection (FM detection), and determination. In the detector 30, the signal is FM-detected and then demodulated into a binary data stream. An output signal of the detector 30 is supplied to an error correction circuit 32 and a sync detector 34. The circuit 32 corrects an error on the basis of BCH codes and, more specifically, it corrects an error based on the BCH (31, 21) system at the time of POCSAG communication (reception of two-way pager communication) and does an error correction based on an error correction system suitable for the SSFH system at the time of SSFH communication (reception of peer-to-peer communication) in response to a control signal supplied from the microcomputer 36.

It is possible to correct an error by using the error correction method based on the BCH (31, 21) system at the time of SSFH communication. According to this modification, it is possible to reduce the size of the error correction circuit 32.

The output signals of error correction circuit 32 and sync detector 34 are supplied to the microcomputer 36. A keyboard 54 and a display 56 are connected to the microcomputer 36 through a man-machine interface 52.

Though it is possible to perform an error correction by means of the microcomputer 36, the error correction circuit 32 is provided in addition to the microcomputer 36 in order to clearly distinguish the functions of the error correction circuit 32 and the microcomputer 36.

The transmission signal output from the microcomputer 36 is sent to coders 40 and 42. The coder 40 encodes data based on the two-way pager communication system in its up link at the time of transmission of two-way pager communication, while the coder 42 encodes data based on the BCH (31, 21) system at the time of transmission of peer-to-peer communication. The output signals of the coders 40 and 42 are transmitted to a selector 48 through filters 44 and 46, respectively. Since a coding procedure is simple in its operation, it is possible to perform a coding procedure by means of the microcomputer 36. The filters 44 and 46, which are preamplifiers for limiting the band of a modulated signal, shape the waveform of a data stream. The selector 48 selects an output of the filter 44 at the time of transmission of the two-way pager communication and selects that of the filter 46 at the time of transmission of peer-to-peer communication. The output signal of the selector 48 is supplied to a direct modulator 50 to directly modulate the output signal of the oscillator 38. The output signal of the modulator 50 is supplied to the antenna 22 via the selector 24. The modulator 50 is always supplied with a signal whose frequency varies with a predetermined pattern.

Figure 4:
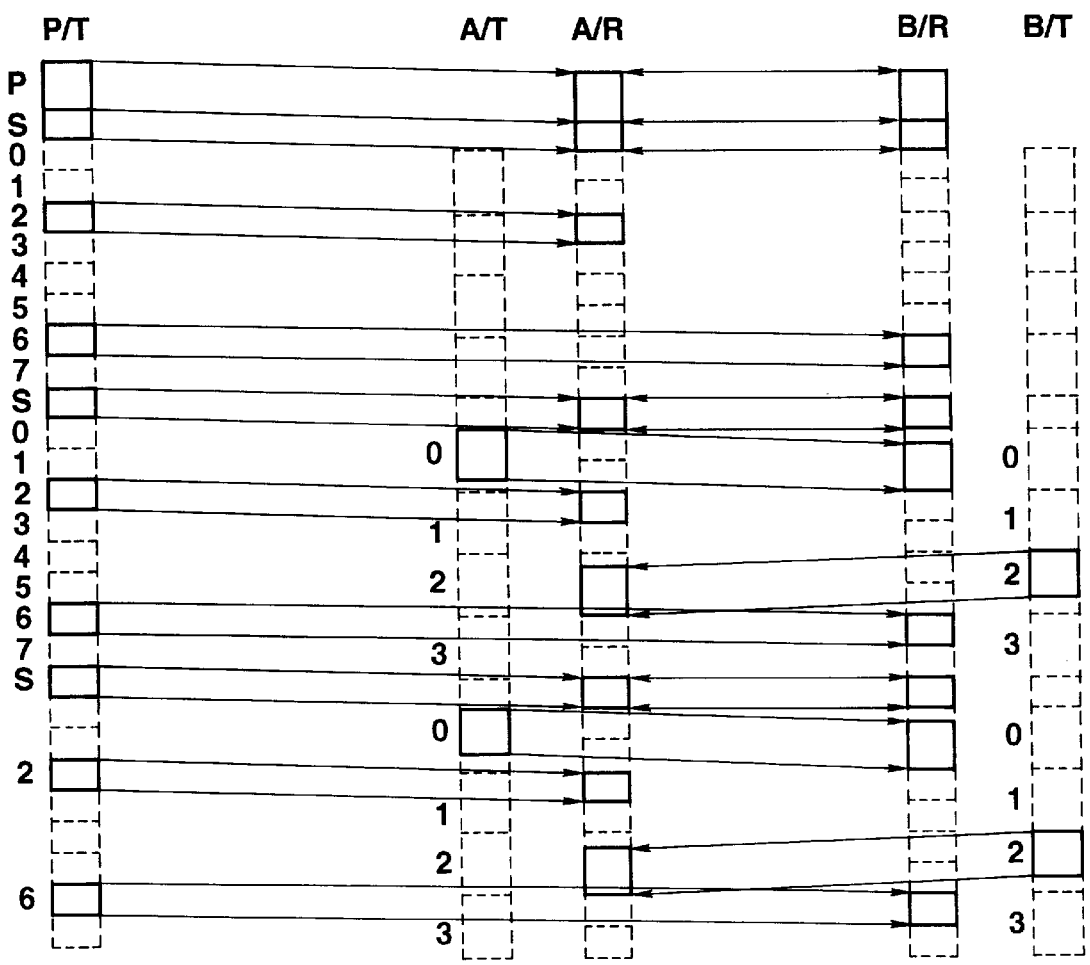
FIG. 4 is a timing chart showing the operation of the multimode radio communication system according to the first embodiment.

FIG. 4 is a timing chart of an operation of the multimode radio communication system of the first embodiment in which the POCSAG communication system is employed for the pager system. In the first embodiment, the base station (paging station) P/T only transmits a signal and two terminals A and B both transmit and receive a signal. Hereinafter /T and /R indicate transmission and reception, respectively. The base station P/T transmits a preamble P and then a sync signal S in a fixed period. The cycle of the sync signal S is divided into a plurality of time slots, e.g., eight time slots 0 to 7. Any one of the time slots 0 to 7 is assigned to each of the terminals in accordance with a calling number, and paging reception (A/R, B/R) is performed only within the assigned time slot. In this example, time slot 2 is assigned to the terminal A and time slot 6 is assigned to the terminal B. In order to perform paging reception only within the assigned time slot, these terminals are controlled so as to operate in synchronization with the preamble P and sync signal S. The selector 24 usually selects the reception mode, the oscillator 38 oscillates the signal of the predetermined frequency and the error correction circuit 32 corrects an error based on the BCH (31, 21) system in order to receive the paging signal according to the POCSAG system. Usually, the terminal performs a paging reception operation only within the assigned time slot (time slot 2 or 6) and the time slots for the preamble P and the sync signal S, and stops a paging reception operation during the other time slots in order to reduce power consumption.

Each of the terminals includes time slots for peer-to-peer communication synchronized with the sync signal S. In this embodiment, two paging time slots correspond to one peer-to-peer communication time slot. For example, when a user of terminal A wishes to start peer-to-peer communication with terminal B, terminal A/T transmits message data to terminal B/R using a peer-to-peer communication time slot ("0" in this case) excluding its own paging time slot. The selector 24 selects a transmission mode, the coder 42 encodes the message data by the BCH (31, 21) system, and the selector 48 selects an output signal of the filter 46. The signal output from the selector 48 is SSFH-modulated by the direct modulator 50, and the modulated signal is transmitted from the antenna 22 to the terminal B/R. Upon receiving the message data, the terminal B/T transmits response message data to the terminal A/R using a peer-to-peer communication time slot ("2" in this case) excluding its own paging time slot. Similarly, data is transmitted and received between terminals A and B using peer-to-peer communication time slots.

Since terminals A and B are operated in response to the sync signal S supplied from the base station P/T, the synchronized peer-to-peer communication can be achieved without any special synchronizing circuit. Since, furthermore, the peer-to-peer communication is performed using a time slot other than a paging time slot, the terminals can be operated as a normal pager after the peer-to-peer communication is started. It is to be noted that the peer-to-peer communication slot is employed when a response message is transmitted to a base station in response to a paging signal from the base station. In this case, the start timing of the frequency hopping in an SSFH system begins at the end of the first sync signal S following the preamble signal P.

As has been described above, the two-way pager terminals 18a and 18b respond to a paging signal and enable peer-to-peer communication without using the base station. Consequently, a multimode radio communication system capable of high-speed peer-to-peer communication can be attained without increasing the load on infrastructure equipment.

Figure 5:
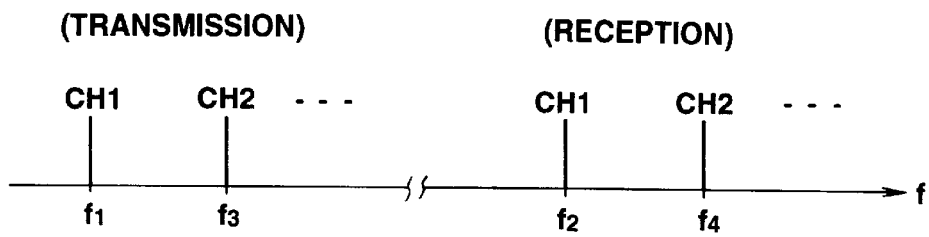
FIG. 5 is a schematic view of a frequency multiplex communication system as an example of multiplex communication system according to the first embodiment.
Figure 6:
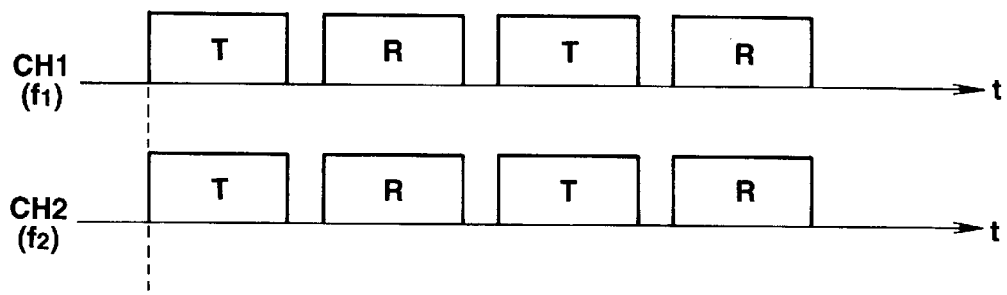
FIG. 6 is a schematic view of a time multiplex communication system as another example of multiplex communication systems according to the first embodiment.
Figure 7:
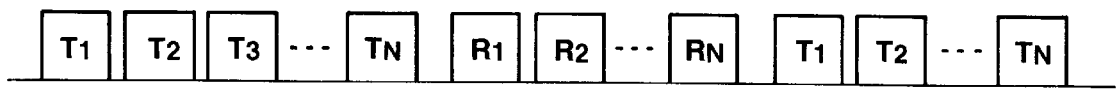
FIG. 7 is a schematic view of still another example of a multiplex communication system according to the first embodiment.

Multiple access communication is suitable for peer-to-peer communication, and an example thereof is illustrated in FIGS. 5 to 7. FIG. 5 shows an example of an FDMA (frequency division multiple access) system where the frequencies used for the communication vary from terminal to terminal and between transmission and reception modes. Specifically, channels 1 and 2 are assigned to terminals 1 and 2, respectively, and channel 1 has transmission frequency $f_1$ and reception frequency $f_2$, while channel 2 has transmission frequency $f_3$ and reception frequency $f_4$. FIG. 6 shows an example of a TDMA (time division multiple access) system where different frequencies are assigned to terminals and different transmission and reception time slots are applied to each terminal. FIG. 7 shows an example of a TDD-TDMA system where all terminals have the same frequency but time slots vary from terminal to terminal or between transmission and reception modes. A radio circuit can be effectively used by means of multiple access communication For example, a TDMA system may be used for the two-way pager system (up link) and an SSFH system at ISM band may be used for the peer-to-peer communication system.

Second Embodiment

A multimode radio communication system according to other embodiments of the present invention will now be described. The same structural elements as those of the first embodiment are denoted by the same reference numerals and their detailed descriptions are omitted. In the first embodiment, a terminal continues receiving a sync signal and is operated to be in synchronism with the sync signal even after peer-to-peer communication is started, and it can receive a paging signal, whereas in the second embodiment, a terminal is completely separated from a base station after peer-to-peer communication is started.

Figure 8:
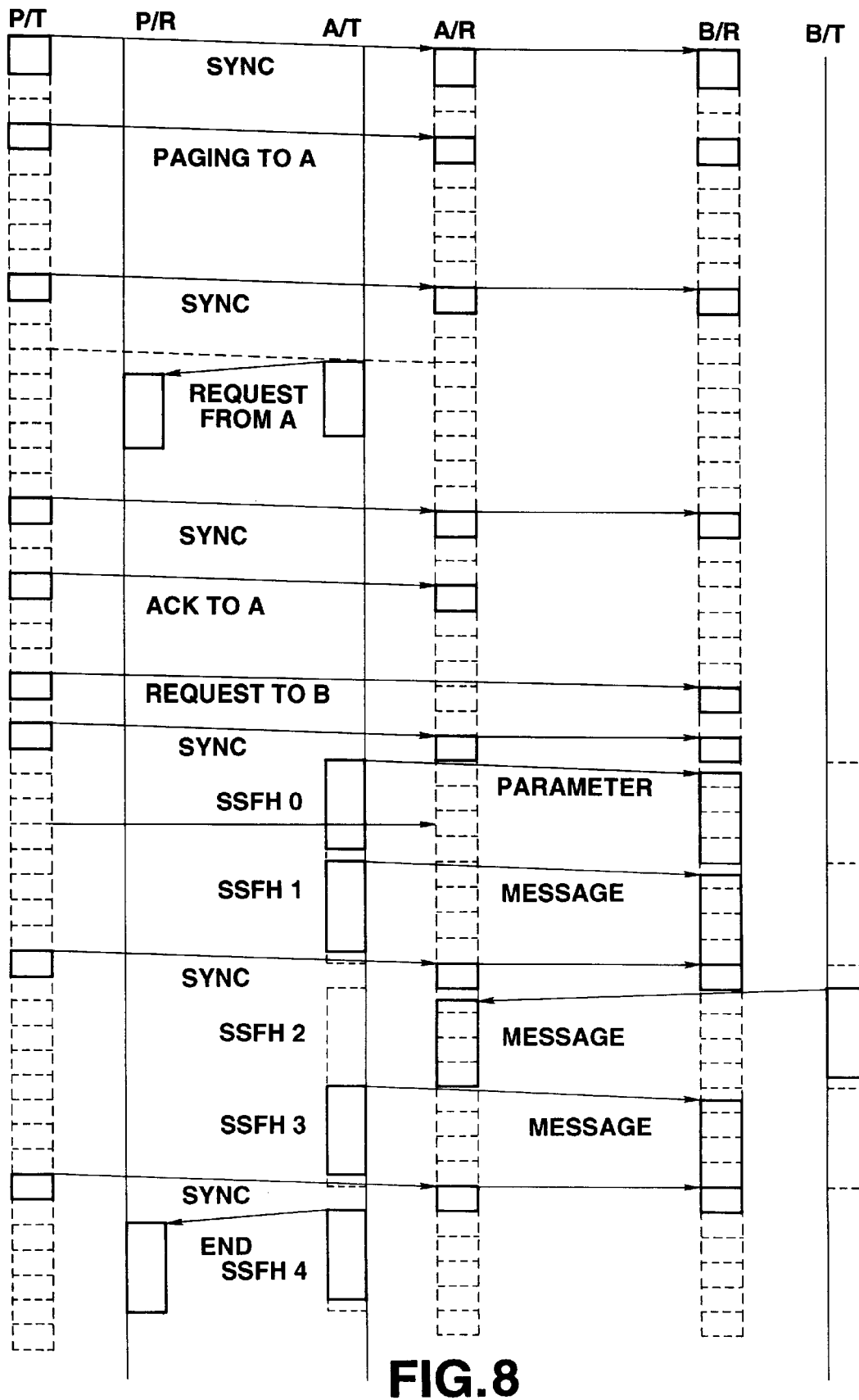
FIG. 8 is a timing chart showing an operation of a multimode radio communication system according to a second embodiment of the present invention.

FIG. 8 is a timing chart of the communication system of the second embodiment. Terminal A/T transmits a peer-to-peer communication request to a base station P/R via the up link of two-way pager communication. If an acknowledgment signal is returned to terminal A/R from the base station P/T on the down link of the two-way pager communication, both terminals A and B are operated to be in synchronism with a sync signal only once. This sync signal establishes the frequency hopping start timing of the SSFH system for the peer-to-peer communication. Then, a parameter for setting a channel is transmitted from terminal A/T to terminal B/R, and transmission/reception of data (peer-to-peer communication) is started. In the example of FIG. 8, it is illustrated that the terminals receive a sync signal transmitted from the pager base station P/T during the peer-to-peer communication. However, as described above, it is not necessary to make the terminals receive the sync signal after the start of the peer-to-peer communication. Upon completion of the communication, an end signal is transmitted from one of the terminals (terminal A/T in FIG. 8) to the base station P/R. In the second embodiment, too, the peer-to-peer communication is multiplexed.

Third Embodiment

Figure 9:
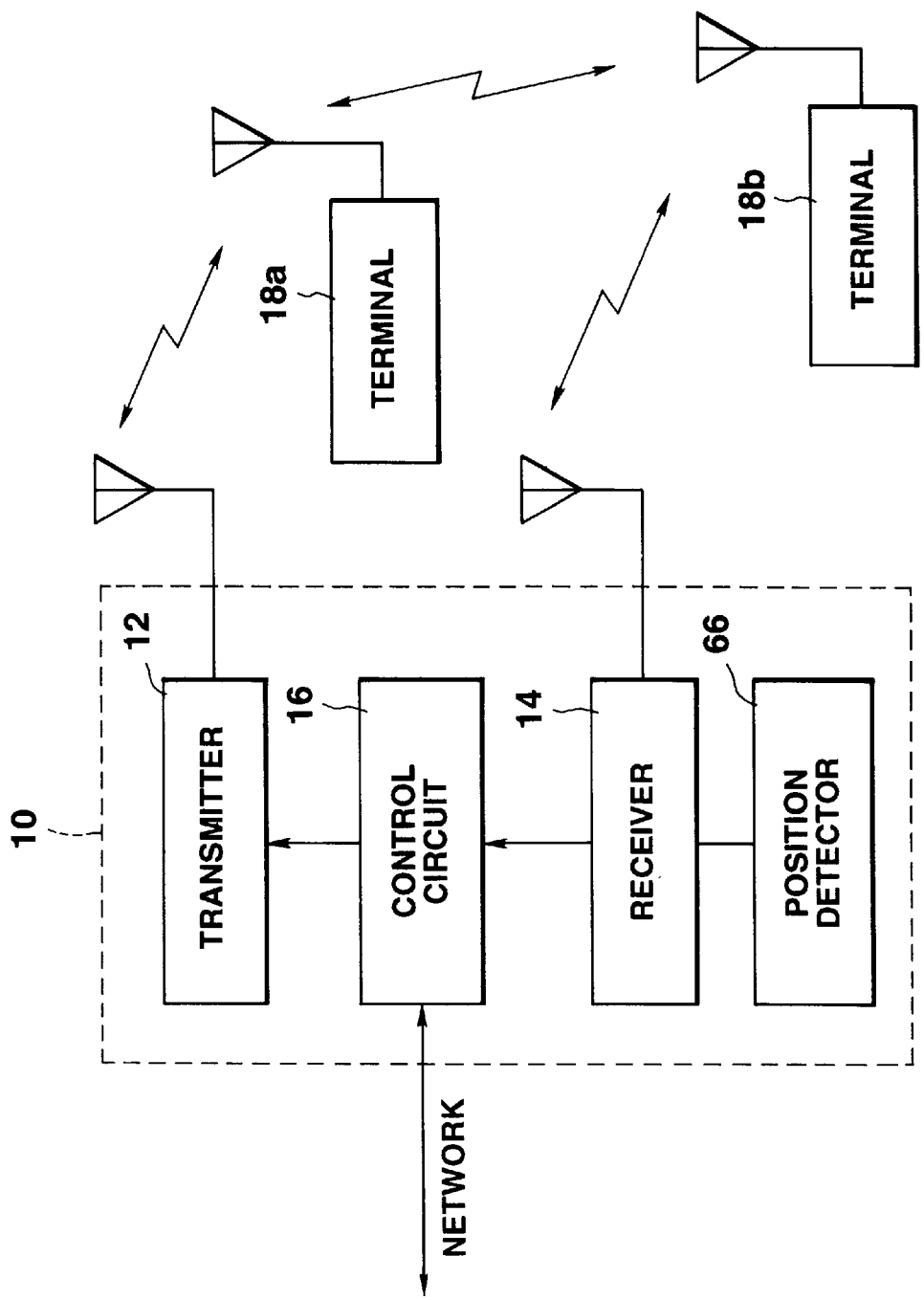
FIG. 9 is a block diagram showing the entire constitution of a radio communication system according to a third embodiment of the present invention.

The first and second embodiments assume on that the peer-to-peer communication can always be executed. Since, however, the terminals are portable and movable, the peer-to-peer communication cannot always be done. According to the third embodiment, when peer-to-peer communication is made impossible due to geographic conditions or the like, it is replaced with two-way pager communication in which a signal is transmitted via a base station. Therefore, as shown in FIG. 9, the receiver 14 of the base station 10 is provided with a position detector 66 for detecting the position of a terminal. The position of a terminal is detected based on the phase and intensity of a received signal from the terminal. Such a detector is disclosed in U.S. Pat. No. 5,379,047; and No. 5,335,246, etc.

Figure 10:
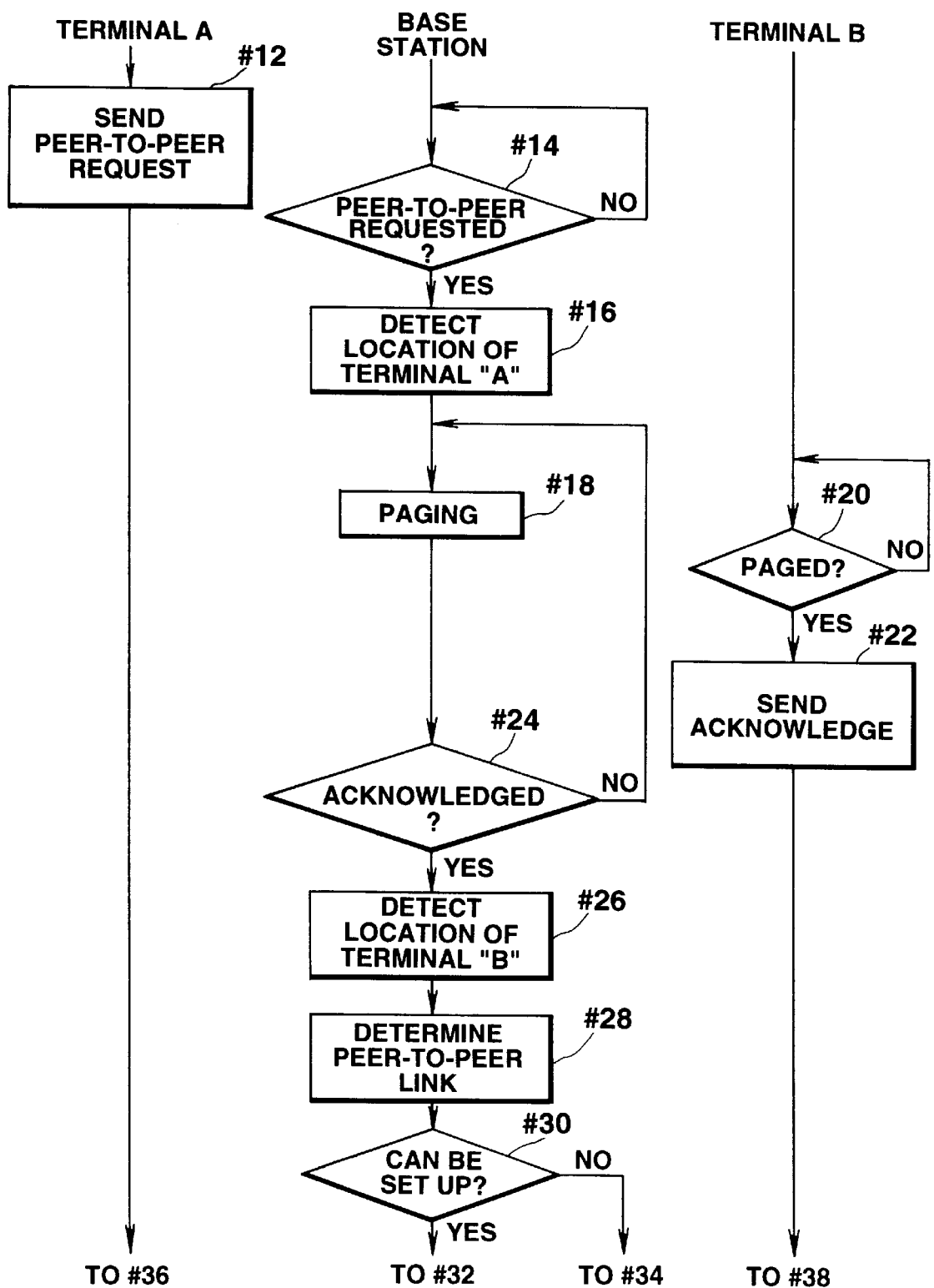
FIG. 10 is a flowchart showing the first half of the operation of the third embodiment.
Figure 11:
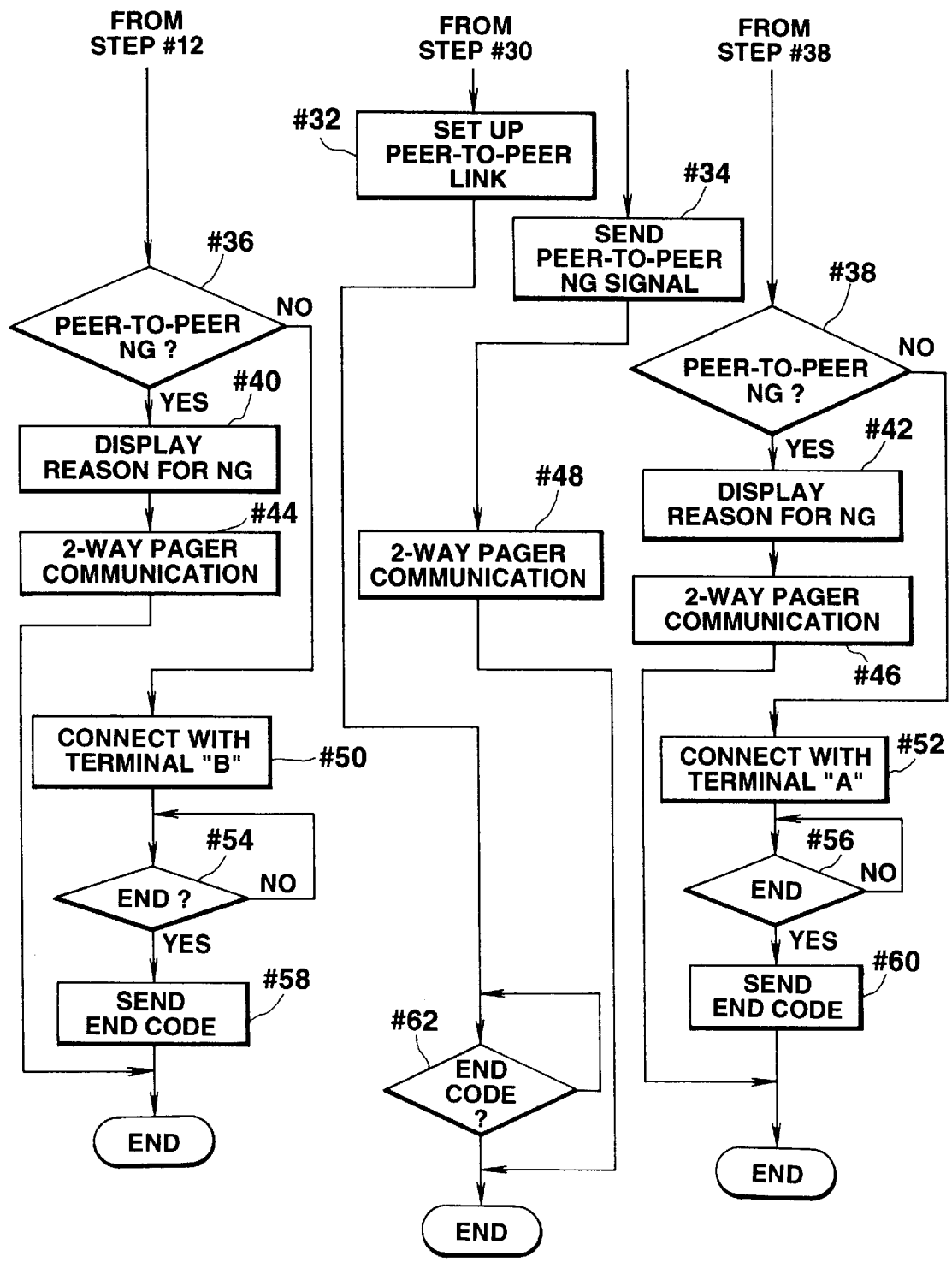
FIG. 11 is a flowchart showing the second half of the operation of the third embodiment.

FIGS. 10 and 11 are flowcharts depicting peer-to-peer communication from terminal "A" to terminal "B" in the system of the third embodiment. In step #12, terminal "A" sends a peer-to-peer communication request to a base station. Upon acknowledging receipt of the request in step #14, the base station detects a position of terminal "A" in step #16. In step #18, the base station informs terminal "B" of the peer-to-peer communication request by paging. When detecting the paging in step #20, terminal "B" returns an acknowledgment signal to the base station in step #22. In step #24, the base station determines whether the peer-to-peer communication is acknowledged by terminal "B". If not, the flow returns to step #18, and paging is performed again. If it is acknowledged, the base station detects a position of terminal "B" in step #26.

In step #28, the base station simulates a radio channel for peer-to-peer communication on the basis of the positions of terminals "A" and "B". It is then determined in step #30 whether the channel can be set up or not based on the result of simulation. If it is determined the channel can be set up, the base station sends parameters (information on transmitting power, frequency, transmission start timing, transmission right, a time period for which data can be transmitted or received, etc.) to terminals "A" and "B" to set up the radio channel in step #32. On the contrary, if it is determined that the channel cannot be set up, the base station sends the reason therefor to terminals "A" and "B" in step #34.

In steps #36 and #38, it is determined whether peer-to-peer communication is possible or impossible in terminals "A" and "B". If the communication is impossible, the reason therefor is displayed in steps #40 and #42, and two-way pager communication wherein data is transmitted via the base station (step #48), is executed in steps #44 and #46. If it is determined that the peer-to-peer communication is possible, it is performed in steps #50 and 52. The peer-to-peer communication ends if one of the terminals "A" and "B" transmits an end code to the base station in steps #58 and #60, and the base station detects the end code in step #62.

According to the third embodiment described above, when one of terminals makes a request for peer-to-peer communication, if the communication cannot be performed because of positions of both the terminals, data can be transferred between them by the two-way pager communication system, without unduly repeating a channel setting operation for the peer-to-peer communication, with the result that infrastructure equipment can be effectively utilized in accordance with circumstances.

In the third embodiment, too, the peer-to-peer communication can be multiplexed as shown in FIGS. 5 to 7.

When the request for peer-to-peer communication is rejected, it is replaced with two-way pager communication using infrastructure equipment. However, one terminal can transmit a request for communication with another terminal to a base station, without considering whether peer-to-peer communication or two-way pager communication is to be executed, and the base station may designate an appropriate communication mode in consideration of the relationship in position between the terminals, the amount of transmission data, etc. and inform the terminals of the mode.

Fourth Embodiment

Figure 12:
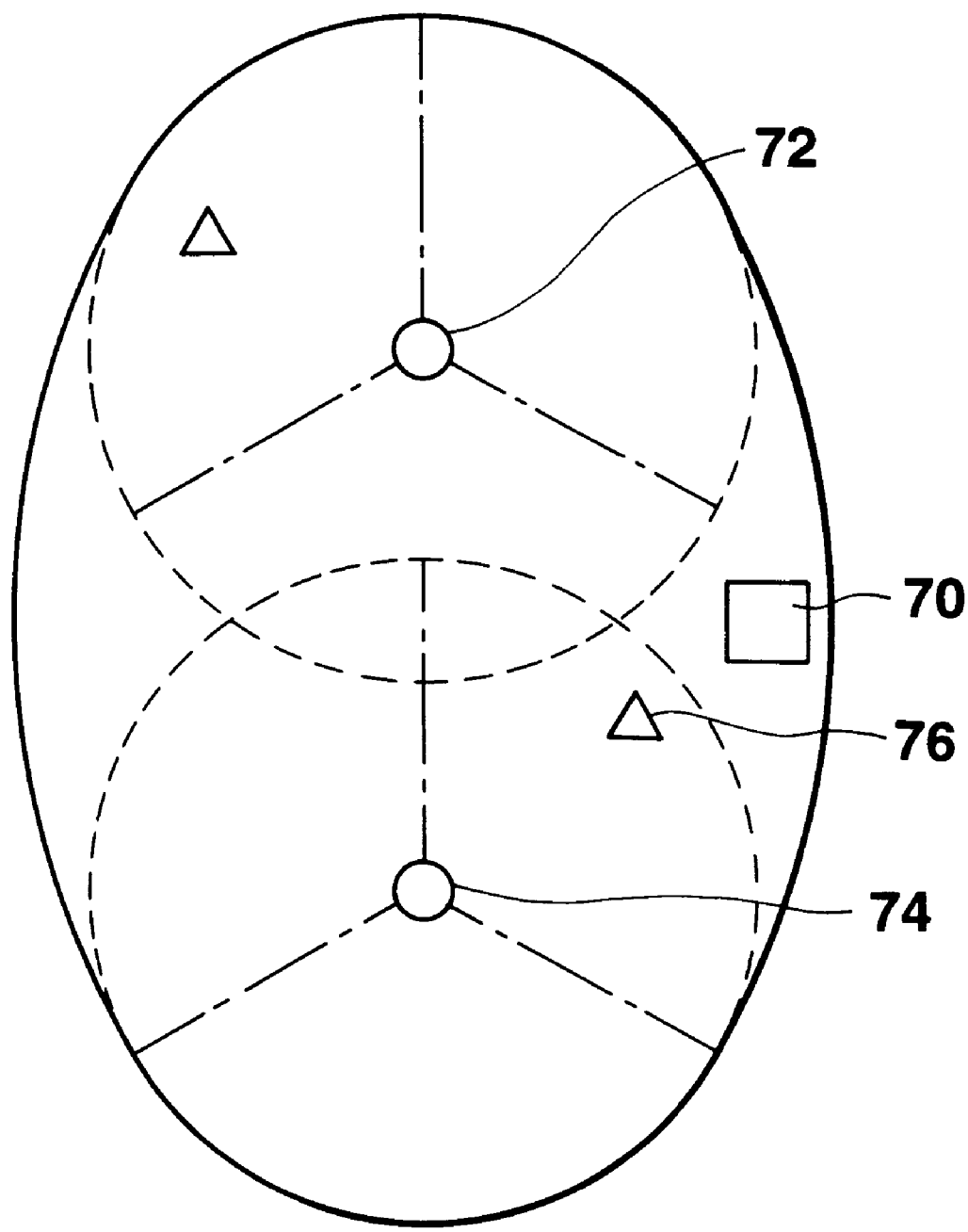
FIG. 12 is a view showing a radio communication system according to a fourth embodiment of the present invention.

A method of detecting a position of a terminal in a multimode radio communication system according to a fourth embodiment of the present invention, will now be described. As is illustrated in FIG. 12, a plurality of receiving base stations, e.g., two receiving base stations 72 and 74 in this embodiment are included in the service area of one transmitting base station 70. The antenna directivity of each receiving base station is divided into sectors. Each of the receiving base stations 72 and 74 detects which sector has received a signal transmitted from a terminal 76. After considering the detection results of all the receiving base stations, the position of the terminal can be detected by triangulation. The distance from each receiving base station to its corresponding terminal can be approximately detected by measuring the intensity of a received signal.

According to the fourth embodiment, each base station can detect its terminal position with a simple arrangement.

Fifth Embodiment

Figure 13:
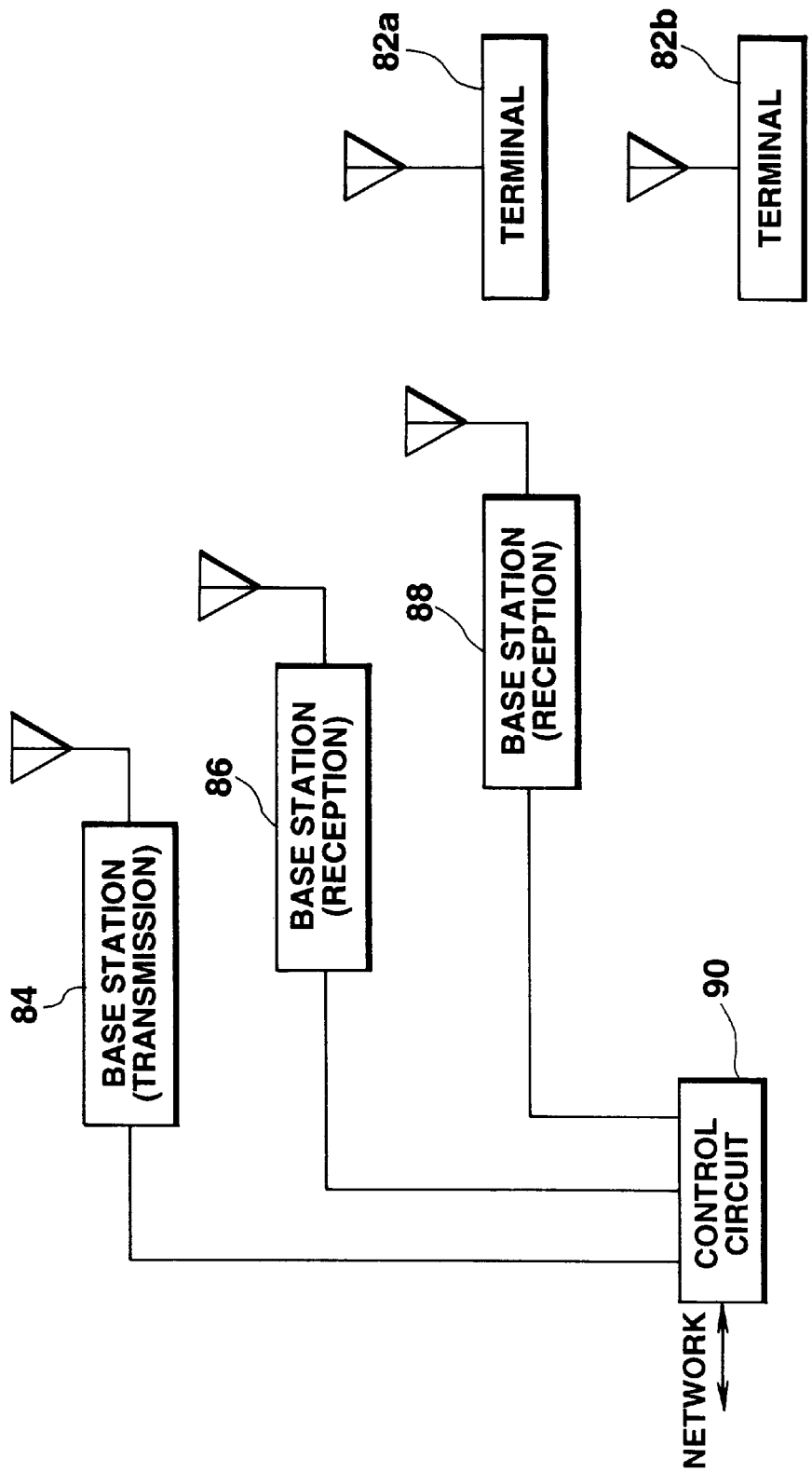
FIG. 13 is a block diagram showing the entire constitution of a radio communication system according to a fifth embodiment of the present invention.

FIG. 13 is a block diagram showing the entire constitution of a radio communication system according to a fifth embodiment of the present invention. In the third and fourth embodiments, a base station detects a position of a terminal. However, in the fifth embodiment, a terminal detects its own position. As shown in FIG. 13, the service area of two-way pagers (terminals) 82a and 82b includes one transmitting base station 84 and a plurality of receiving base stations 86 and 88 corresponding thereto. The transmitting base station 84 and receiving base stations 86 and 88 are connected to a control circuit 90. Each of the terminals 82a and 82b detects its own position by a GPS (global positioning system) or other self-detection system for detecting the position thereof without using other devices.

Figure 14:
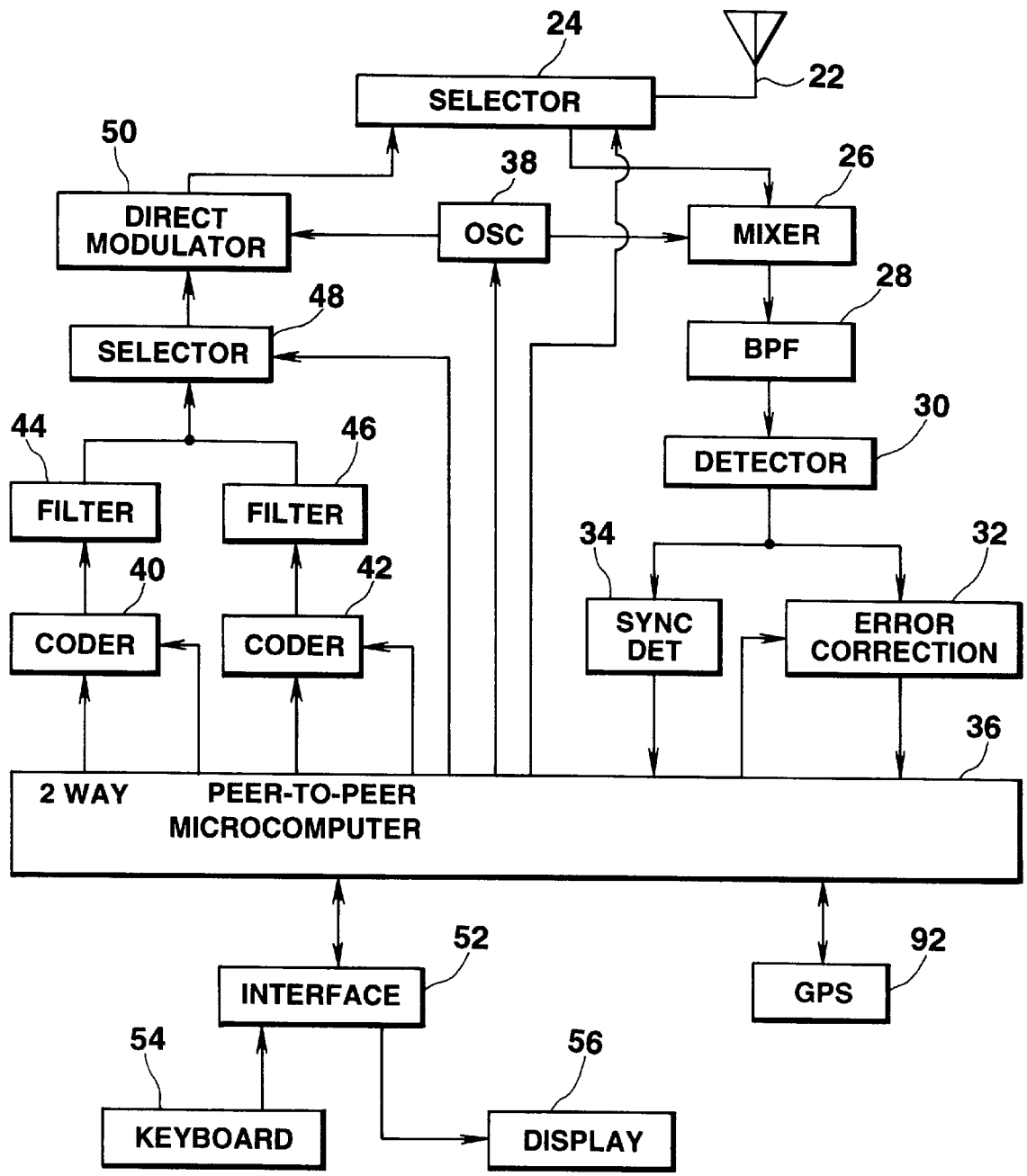
FIG. 14 is a block diagram showing a radio communication terminal according to the fifth embodiment.

The constitution of each terminal is illustrated in FIG. 14. The terminal of the fifth embodiment differs from that of the first embodiment only in that a GPS 92 is added.

Figure 15:
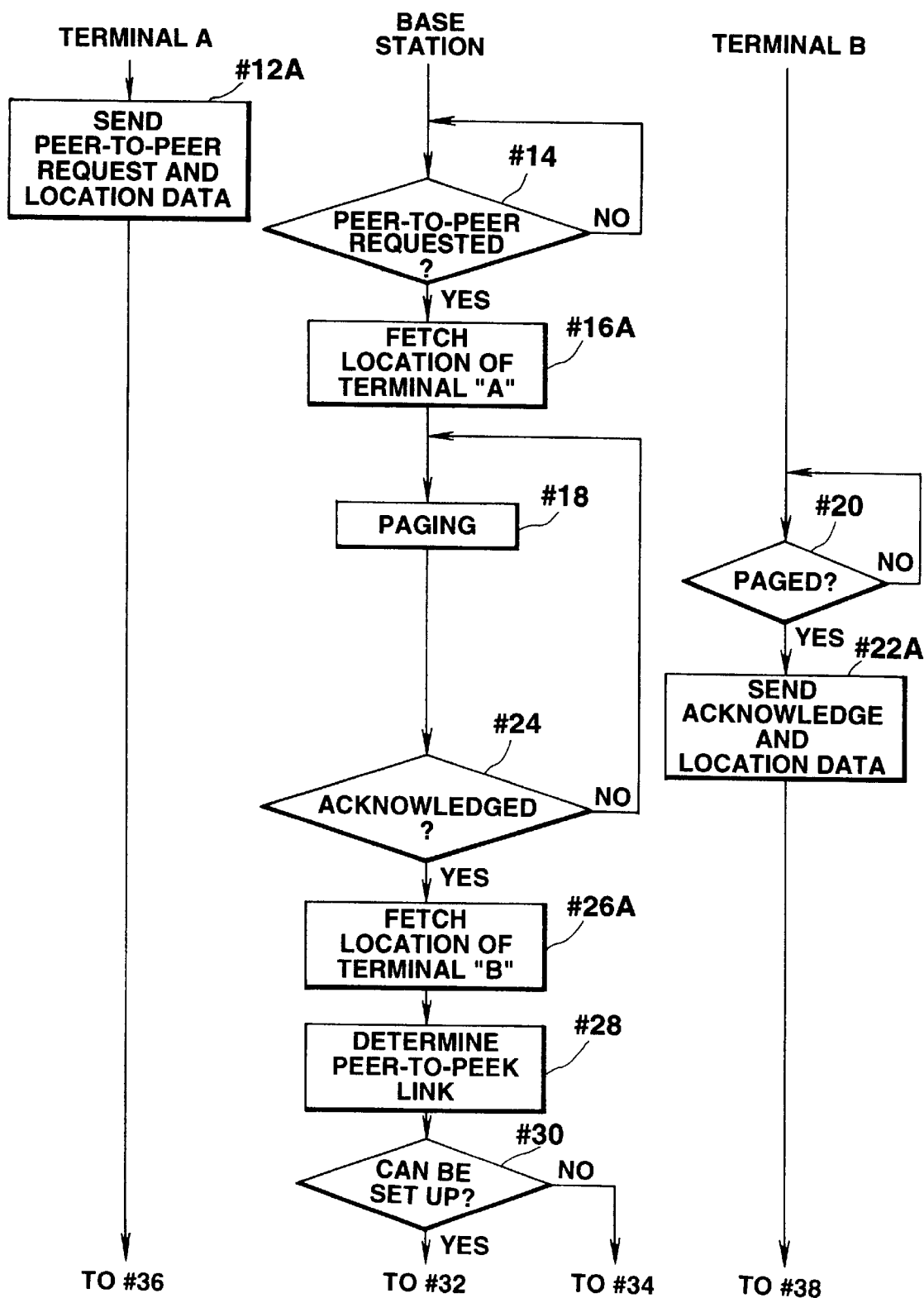
FIG. 15 is a flowchart showing the first half of the operation of the system according to the fifth embodiment.
Figure 16:
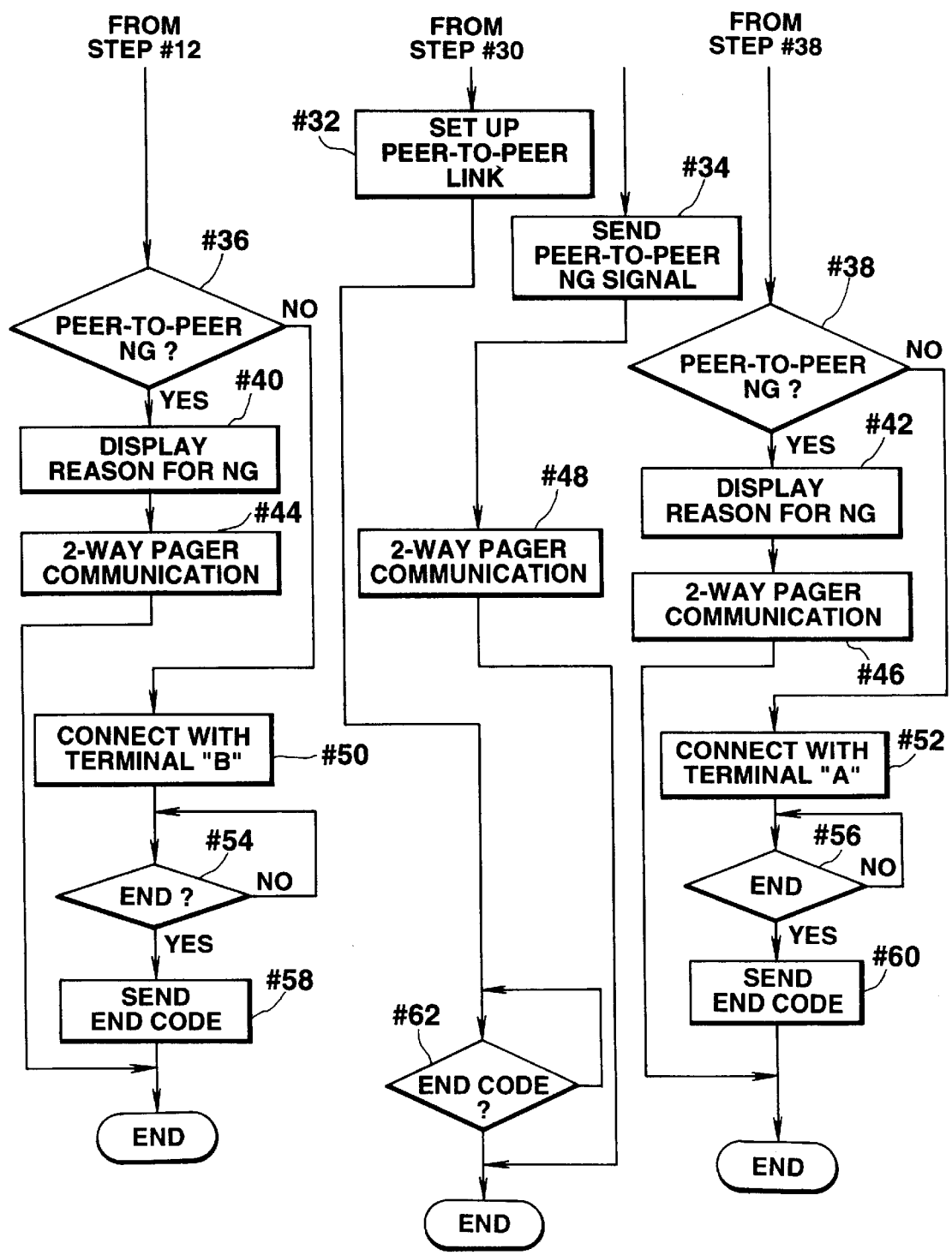
FIG. 16 is a flowchart showing the second half of the operation of the system according to the fifth embodiment.

FIGS. 15 and 16 are flowcharts of an operation of the radio communication system according to the fifth embodiment. This flowchart is the same as that shown in FIGS. 10 and 11, directed to the third embodiment, except that a position of a terminal is detected not by a base station, but by the terminal itself. In both the flowcharts, the same steps are indicated by the same reference numerals. In the fifth embodiment, terminal "A" transmits a peer-to-peer communication request and its own positional information to a base station in step #12A, the base station receives the positional information of terminal "A" in step #16A, and terminal "B" transmits an acknowledgment signal and its own positional information to the base station in step #22A. The other steps of the fifth embodiment are the same as those of the third embodiment.

In the fifth embodiment wherein a terminal detects its own position and transmits it to a base station, too, the same advantage as that of the third embodiment can be obtained.

Sixth Embodiment

Figure 17:
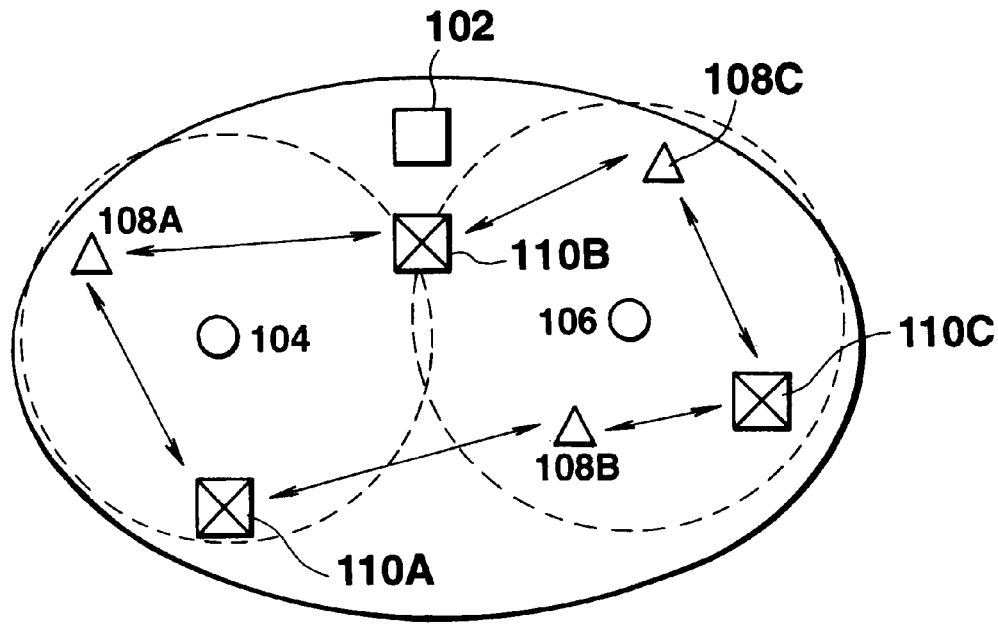
FIG. 17 is a view showing a radio communication system according to a sixth embodiment of the present invention.

In the foregoing embodiments, peer-to-peer communication is performed using only two terminals. The radio communication system of the sixth embodiment comprises relay stations for peer-to-peer communication. FIG. 17 shows the entire constitution of the system according to the sixth embodiment. Referring to FIG. 17, the service area of one transmitting base station 102 includes a plurality of receiving base stations, e.g., two receiving base stations 104 and 106 in this embodiment. The antenna directivity of each receiving base station is divided into sectors in the same manner as in the fourth embodiment. The receiving base stations 104 and 106 detect which sectors have received signals transmitted from terminals 108A, 108B and 108C. After considering the detection results of all the receiving base stations, the positions of the terminals can be detected by triangulation. The distances between the receiving base stations and terminals can be approximately detected by measuring the intensity of received signals. Furthermore, a plurality of relay stations 110A, 110B and 110C for relaying peer-to-peer communication between the terminals is provided. The base station simulates the radio channel for peer-to-peer communication based on the positions of the terminals and determines whether or not a relay station is necessary for peer-to-peer communication. If it is determined that a relay station is necessary for peer-to-peer communication, the base station transmits a parameter signal indicating the positions of the terminals to the relay station and a parameter signal indicating the address of the relay station to the terminals. After a radio channel for relaying communication is set up, the terminals and the relay station are separated from the base station. When the peer-to-peer communication ends, one of the terminals transmits an end code to the base station to inform the base station of the code of the peer-to-peer communication.

Figure 18:
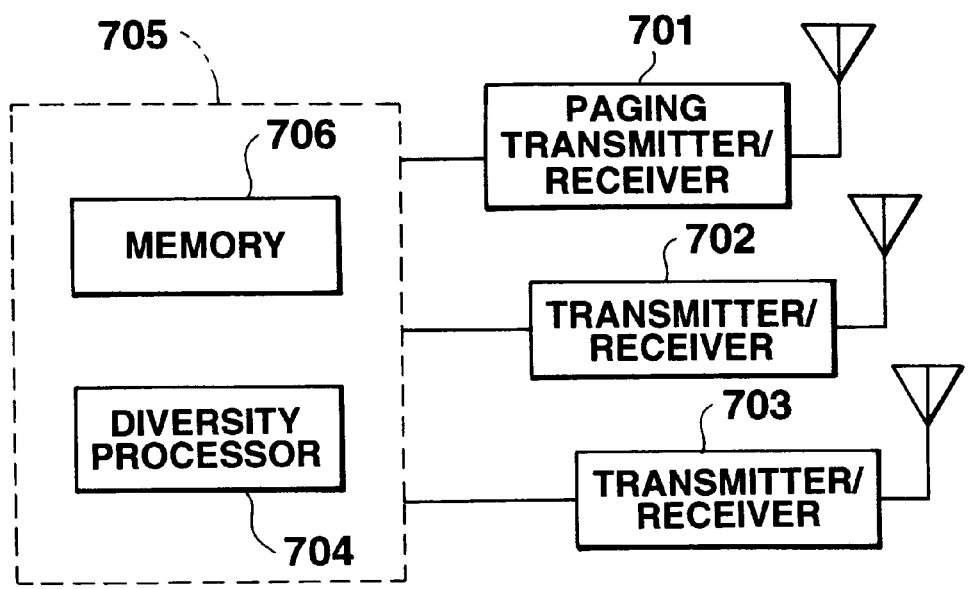
FIG. 18 is a block diagram showing the constitution of a relay station of the radio communication system according to the sixth embodiment.

FIG. 18 is a block diagram showing a constitution of each of the relay stations 110A, 110B and 110C. Each relay station includes a transmitter/receiver 701 for transmitting/receiving a signal to/from base stations (transmitting and receiving base stations), a transmitter/receiver 702 for peer-to-peer communication with another relay station, a transmitter/receiver 703 for transmitting/receiving a signal to/from a terminal, and a controller 705 having a memory 706 for storing a channel setting parameter and circumstances information for peer-to-peer communication and a diversity processor 704 for executing diversity processing. The controller 705 is connected to a paging network.

The antenna of the transmitter/receiver 702 of one relay station has a directivity toward another relay station. In other words, if there are a plurality of relay stations, the antenna of the relay station is directed to its target one.

Since, furthermore, the positional information of a terminal can be detected, the transmitter/receiver 703 for communicating with the terminal directs its antenna toward the terminal, with the result that transmission/reception power can be decreased and interference or disturbance can be lessened.

Figure 19:
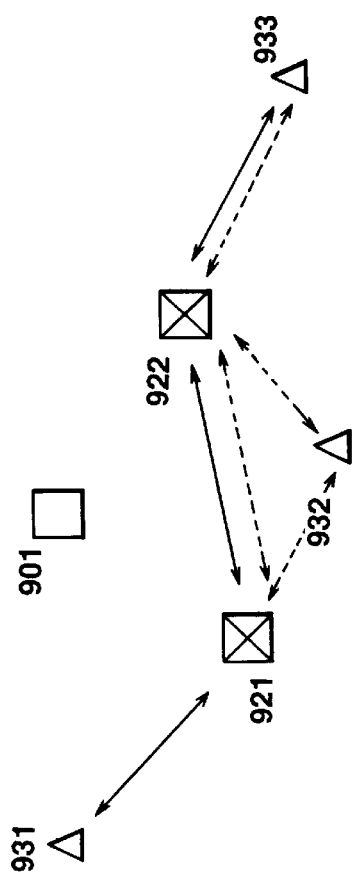
FIG. 19 is a view of the constitution of the radio communication system according to the sixth embodiment wherein a signal is transmitted via a plurality of relay stations.

FIG. 19 shows the constitution of the system according to the sixth embodiment wherein a signal is transmitted via a plurality of relay stations. As shown in FIG. 19, a relay station 921 receives a signal directly from a terminal 932 and also receives a signal therefrom via a relay station 922. Based on these received signals, diversity processing is executed. In FIG. 19, reference numeral 901 denotes a transmitting base station and reference numerals 931 and 933 indicate terminals.

Figure 20:
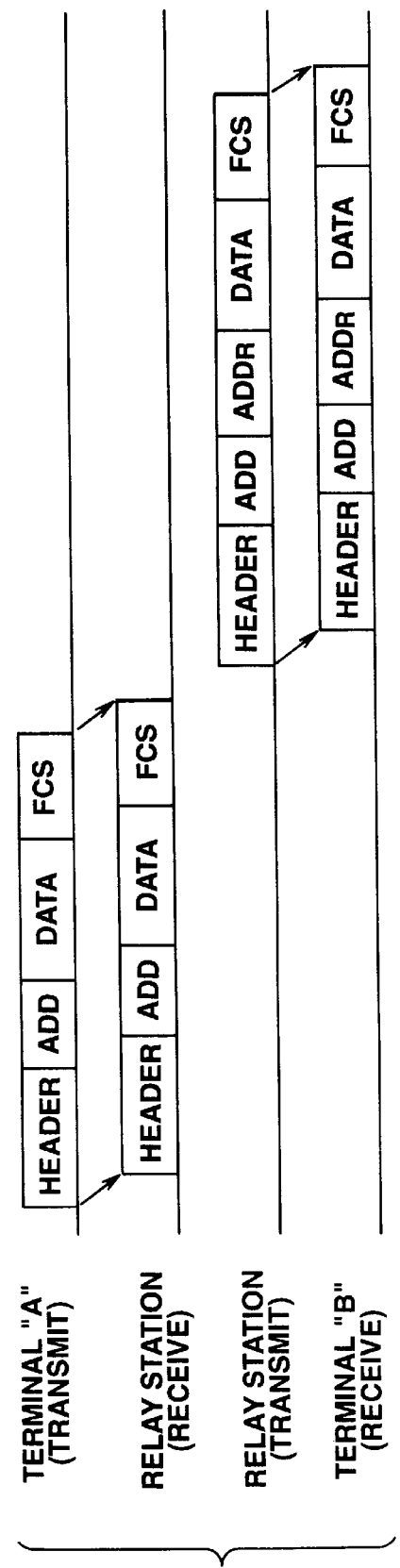
FIG. 20 shows data transitions when a signal is transmitted via a relay station.

FIG. 20 is a view of data transition when a signal is relayed by a relay station. A signal transmitted from terminal "A" to a relay station contains a header, an address (transmission/reception), data, and FCS (error correction code). This signal is received by the relay station as it is. The relay station adds its address $ADD_R$ to the received signal and sends it to terminal "B". The signal transmitted from the relay station to terminal "B" thus contains a header, an address (transmission/reception), a relay station address data, and an FCS.

Figure 21:
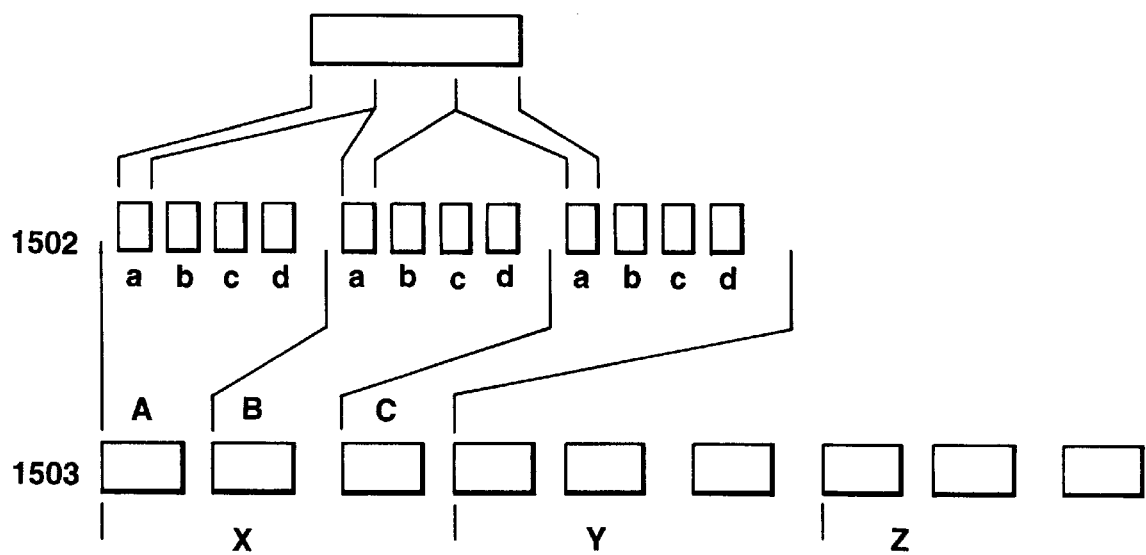
FIG. 21 shows the data structure at the relay station.

FIG. 21 is a view for explaining the structure of data at a relay station and, in this case, TDMA is employed as a communication system. The amount (length) of transmitted data is arbitrarily determined and then divided into frames each having a predetermined width. In other words, the number of frames varies with the amount of data. Each of the frames is divided into four slots. The three frames constitute one super frame. In the example of FIG. 21, data is divided into three frames. The data are assigned to the first slots (slots "a") of each of the frames.

According to the aforementioned sixth embodiment, a relay station or stations are added to lengthen the distance between terminals capable of peer-to-peer communication and to enlarge the range in which the peer-to-peer communication can be utilized.

The following advantages can be obtained from the above-described multimode radio communication system of the present invention:

(1) The communication between terminals, which was conventionally performed by a dedicated radio network, can be done by a peer-to-peer communication system, without requiring any infrastructure.

(2) Since a base station recognizes the position of a terminal, it is able to judge whether peer-to-peer communication between terminals is possible or impossible. No communication for setting a peer-to-peer communication channel is needed between the terminals, thus improving in communication efficiency. If a radio channel setting parameter for peer-to-peer communication is transmitted to the terminals, or if a radio channel setting parameter is set to the terminals so as to prevent mutual interference between the terminals, a number of users of the terminals can perform peer-to-peer communication in the same area, thereby improving in efficiency of use of peer-to-peer communication.

(3) Since a plurality of receiving base stations are provided, the positions of terminals can be detected by triangulation from detection results of estimated positions of the terminals at the respective base stations.

(4) The relay function enhances the capability of peer-to-peer communication and allows output signals of terminals to be collected on one relay station. Consequently, diversity processing can be executed, and the reliability, serviceability and convenience of the system are improved.

(5) To lengthen the distance between terminals for peer-to-peer communication, a relay radio device is provided, and it is provided with a directional antenna whose directivity is electrically variable. Thus, the transmission power between the relay device and terminals can be decreased, the lifetime of batteries of the terminals can be lengthened, and a radio wave interference with other radio communication systems can be reduced.

(6) The position of a terminal is acquired by an up link of a two-way pager system capable of peer-to-peer communication. The communication system, frequency, transmission timing, transmission right, transmission time of the terminal for the peer-to-peer communication, are controlled. The frequency and timing necessary for the peer-to-peer communication are transmitted to the terminal by a down link thereof. Consequently, a number of terminals can perform the peer-to-peer communication, and a very convenient communication system can be achieved.

Figure 22:
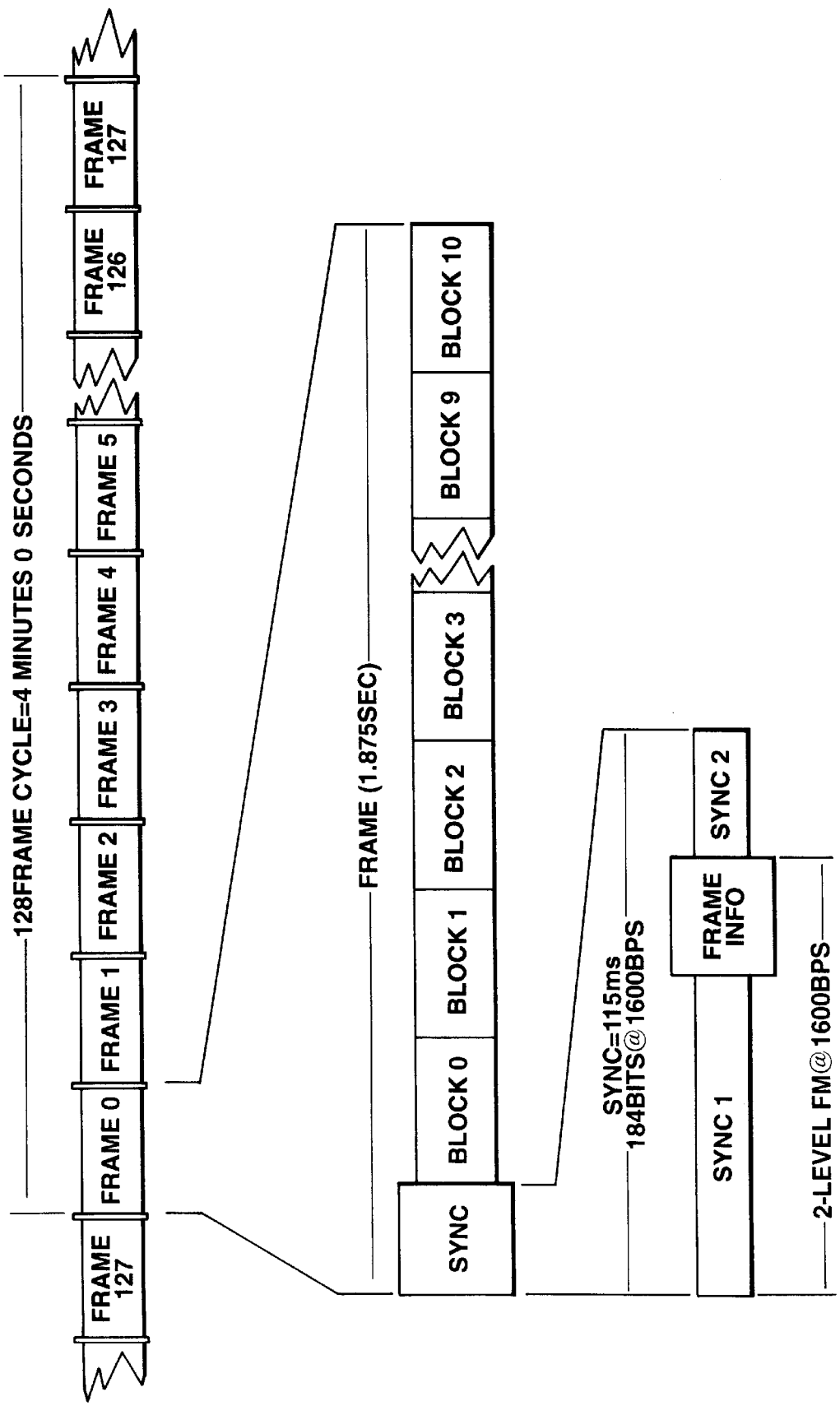
FIG. 22 shows code format according to a modified embodiment of the present invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, a POCSAG system is used for a down link of the two-way pager communication. However, there are other communication systems, such as a FLEX (trademark) system which is described in the U.S. Pat. No. 5,128,665 and is proposed by Motorola. FIG. 22 shows a data format of the FLEX system in which one cycle is comprised of 128 frames. Each frame is comprised of a sync signal and eleven blocks. The terminal of the present invention is operated to be in synchronism with the sync signal and to generate an SSFH timing signal.

What is claimed is:

1. A multimode radio communication system comprising:

a base station connected to a wire communication network, the base station periodically transmitting a sync signal, each period of the sync signal being divided into a plurality of time slots; and a plurality of radio communication terminals wirelessly connected to said base station, said plurality of radio communication terminals operating in synchronization with the sync signal transmitted from said base station, and a first radio communication terminal of said plurality of radio communication terminals being capable of indirectly communicating with a second radio communication terminal of said plurality of radio communication terminals through said base station using a first time slot of said plurality of time slots, said first time slot assigned to said first radio communication terminal for communication with said base station, and said first radio communication terminal being capable of directly communicating with the second radio communication terminal using a second time slot of said plurality of time slots, said second time slot assigned to said first radio communication terminal for peer-to-peer communication.

2. The multimode radio communication system according to claim 1, wherein the first radio communication terminal transmits a peer-to-peer communication request to said base station and starts peer-to-peer communication upon reception of a peer-to-peer communication acknowledgment from said base station.

3. The multimode radio communication system according to claim 1, wherein said plurality of radio communication terminals are operated to be in synchronism with the sync signal upon every reception of the sync signal.

4. The multimode radio communication system according to claim 1, wherein said plurality of radio communication terminals are inhibited from being operated to be in synchronism with the sync signal even when receiving the sync signal during peer-to-peer communication.

5. The multimode radio communication system according to claim 1, wherein the first radio communication terminal directly communicates with the second radio communication terminal and transmits a signal to said base station by a spectrum spreading modulation system, and said base station transmits a signal to said plurality of radio communication terminals by a POCSAG (Post Office Code Standardization Advisory Group) system.

6. The multimode radio communication system according to claim 1, wherein said base station comprises:

means for detecting a position of the first radio communication terminal and a position of the second radio communication terminal;

means for determining whether direct communication between the first and second radio communication terminals is possible in accordance with the positions of the first and second radio communication terminals detected by said detecting means; and means for, when said determining means determines that the direct communication is impossible, informing the first and second radio communication terminals of a determination result to indirectly communicate with each other through said base station and for, when said determining means determines that the direct communication is possible, setting a channel for the direct communication to the first and second radio communication terminals.

7. The multimode radio communication system according to claim 6, wherein said base station further comprises:

means for receiving signals transmitted from the first and second radio communication terminals; and means for detecting positions of the first and second radio communication terminals in accordance with amplitudes and phases of the signals received by said receiving means.

8. The multimode radio communication system according to claim 1, wherein the first and second radio communication terminals comprise means for detecting positions thereof, the first radio communication terminal transmits to said base station with a request of direct communication with the second radio communication terminal, together with information of a position of the first radio communication terminal, and said base station comprises:

means for, when the request of direct communication is transmitted from the first radio communication terminal, receiving information of a position of the second radio communication terminal therefrom and determining whether the direct communication between the first and second radio communication terminals is possible in accordance with the positions of the first and second radio communication terminals; and means for, when said determining means determines that the direct communication is impossible, informing the first and second radio communication terminals of a determination result to indirectly communicate with each other through said base station and for, when said determining means determines that the direct communication is possible, setting a channel for the direct communication to the first and second radio communication terminals.

9. The multimode radio communication system according to claim 1, further comprising a single relay station for relaying direct communication between the first and second radio communication terminals.

10. The multimode radio communication system according to claim 1, further comprising a plurality of relay stations for relaying direct communication between the first and second radio communication terminals, each of said plurality of relay stations executing diversity processing based on reception signals transmitted through a plurality of communication paths.

11. The multimode radio communication system according to claim 1, wherein the first radio communication terminal communicates with the second radio communication terminal by a peer-to-peer communication system using two time slots of an indirect communication mode as one time slot of a direct communication mode.

12. The multimode radio communication system according to claim 1, wherein the plurality of radio communication terminals each comprises a selector for selecting one of the indirect communication mode and the direct communication mode.

* * * * *